No. 801,376. PATENTED OCT. 10, 1905.
B. G. VON GYULAFALVA.
DEVICE FOR SECURING AND RELEASING CRADLE POSTS OF TIMBER WAGONS.
APPLICATION FILED MAR. 21, 1904.
2 SHEETS—SHEET 1.
Fig. 1.
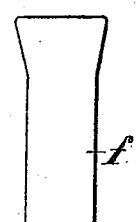
Fig. 2.
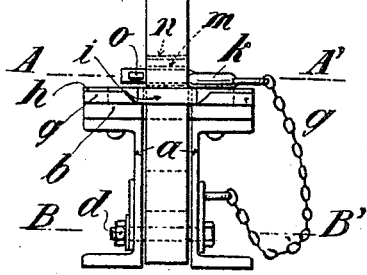
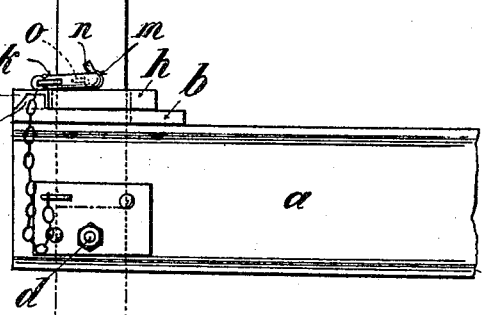
Fig. 5.
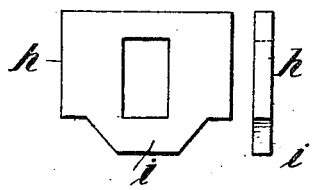
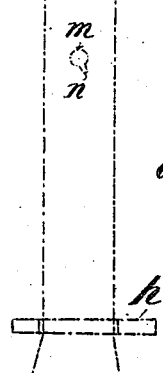
Fig. 4.
Fig. 6.
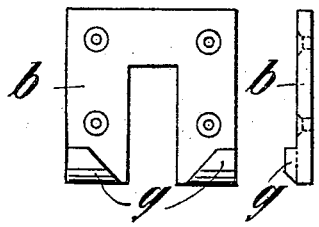
Fig. 3.
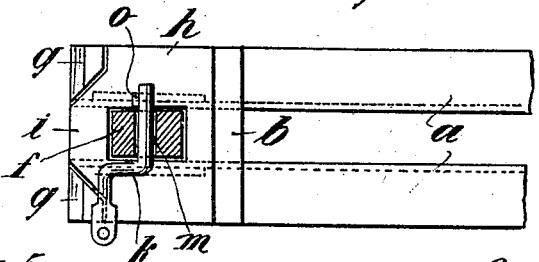
Fig. 5a
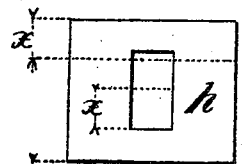
Fig. 6a
Witnesses:
Inventor:
Bernhard Friedel von Gyulafalva
by W. E. Boucker
his Attorney.

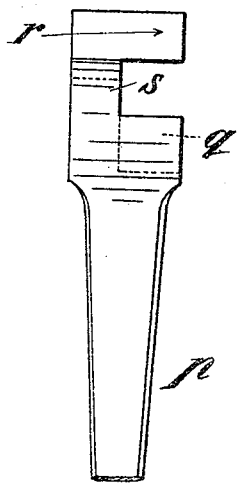
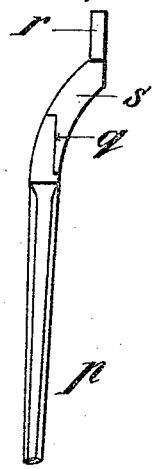
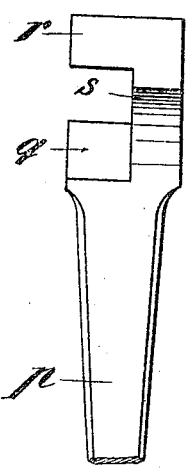
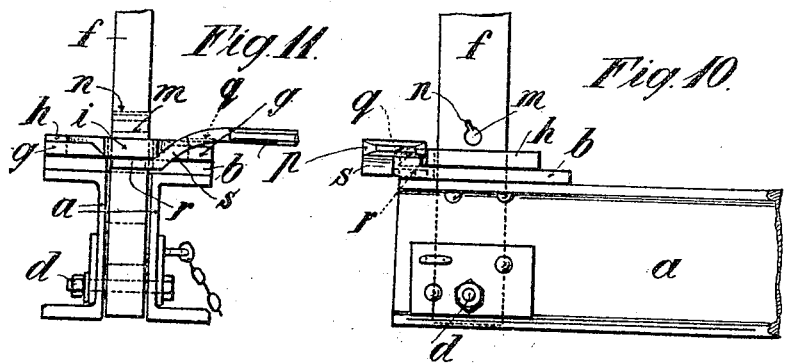
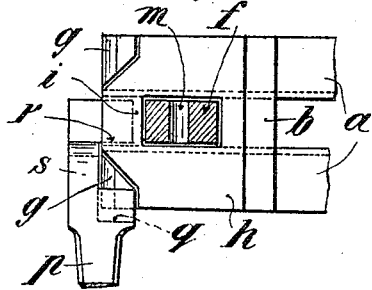

UNITED STATES PATENT OFFICE.

BERNHARD GROEDEL VON GYULAFALVA, OF GYULAFALVA, NEAR KOVÁSZNA AUSTRIA-HUNGARY.

DEVICE FOR SECURING AND RELEASING CRADLE-POSTS OF TIMBER-WAGONS.

No. 801,376.  Specification of Letters Patent.  Patented Oct. 10, 1905.

Application filed March 21, 1904. Serial No. 199,260.

*To all whom it may concern:*

Be it known that I, BERNHARD GROEDEL VON GYULAFALVA, manufacturer, a citizen of Hungary, and a resident at Gyulafalva, near Kovászna, Hungary, Austria-Hungary, have invented certain new and useful Improvements in Devices for Securing and Releasing Cradle-Posts of Timber-Wagons, of which the following is a full, clear, and exact specification.

The subject of the present invention relates to a device for use on cradles of timber-wagons. Wagons as usually constructed for transporting long timber or tree-trunks have each of its two trolleys provided with pivoted cradles in which the upright side posts which confine the timber can be angularly displaced for the purpose of enabling the timber to be loaded or unloaded without its being required to be lifted over the posts.

The present invention relates to a method of construction of the pivoting and securing arrangements of the post which will almost entirely prevent any load pressing on the pivot of the posts and enable the securing device which holds the posts in the upright position to be easily released by an operator standing at the ends of the wagon, so that the wagoner and his assistants are not exposed to the danger of logs rolling onto them from the wagon when released therefrom, the device being also simple in construction and durable.

The accompanying drawings show the new device in various views.

Figure 1 is an end elevation of the pivoted cradle with the post secured in the upright position. Fig. 2 is a side elevation of one-half of the cradle, showing in dotted lines the post in the inverted position. Figs. 3 and 4 are horizontal sections on the lines A A' and B B', respectively, of Fig. 1. Figs. 5 and 6 are details of a portion of the construction in plan and side elevation. Figs. 7, 8, and 9 are three views of the releasing-lever. Figs. 10 to 12 exhibit in various views the method of applying the releasing-lever shown in Figs. 7 to 9 to displace the securing device of the post. Figs. 5$^a$ and 6$^a$ show a modification of a detail.

The pivoted cradle $a$, built up in the usual manner of channel-iron, has at each end on its upper side a plate $b$, which is slotted for a portion of its length to correspond to the width of the space separating the two channel-irons which form the cradle, the length of the slot being sufficient to enable the post $f$ to become inverted by rotating around the bolt $d$, which bolt at the same time unites the channel-irons of the cradle. The ends of the fork of the slotted plate $b$ carry buttresses $g$, Fig. 6, of which the edges which face each other are inclined, so that between them a wedge-like space is inclosed, the width of which diminishes outward. Into this space fits the wedge-shaped projection $i$ of a plate $h$, which is threaded over the post $f$ and adapted to be slid along the same. By means of this device a substantial bearing is provided to support the post $f$, and the pivot-bolt $d$ is thereby relieved of strain to a great extent. Alternatively the wedge-like plate $h$ can be replaced by a rectangular plate, as shown in Figs. 5$^a$ and 6$^a$, which would bear against the buttresses $g\,g$, but without entering between them. By means of the wedge-shaped extension $i$, however, the advantage will result that the posts of the cradle can be situated farther away from one another and the capacity of the cradle increased, as indicated by the dotted lines in Fig. 5$^a$. The same result may also be obtained by forming the buttresses $g$ directly on the upper surface of the cradle, dispensing with the connecting-plate $b$. The plate $h\,i$ is prevented from falling off the post $f$ when inverted by an enlargement on the end of the post.

The post $f$ is secured in the upright position by a pin $k$, which is thrust through a hole $m$ in the post, situated immediately above the plate $b$. In order to provide an automatic locking of the pin $k$, the following device is adopted: In the side of the hole $m$ a slotway $n$ is formed, which is situated so as to be upward when the post is upright. Through this a feather $o$ on the pin $k$ is adapted to pass when the pin is inserted into the hole in one position. The pin itself is cranked on the same side as the feather, so that when it has been thrust through the hole in the angular position required by the slot $n$ and the feather $o$ has emerged on the other side of the post the eccentric weight of the cranked pin $k$ will cause it to turn so that its cranked portion will rest on the upper surface of the cradle. In this position the feather $o$ will be turned out of line with the slot $n$, and the pin will thereby be prevented from falling out.

For the purpose of unloading the wagon, as before mentioned, the post $f$ is inverted. To effect this purpose, the pin $k$ after being suitably turned is withdrawn from the hole $m$ $n$. Notwithstanding the removal of the pin, the post $f$ will remain upright by reason of the interaction of the buttresses $g$ $g$ and the plate $h$ under the influence of the side pressure of the load of timber. In order, therefore, to invert the post, the plate $b$, with its wedge end $i$, must be withdrawn from engagement with the buttresses $g$ $g$. This is effected by means of the lever $p$, Figs. 7–9, of which the under side at $q$ serves as a fulcrum. This is rested on the upper surface of the cradle or on one of the buttresses $g$, while its front end $r$ is inserted into the slot between the two channel-irons of the cradle and engages beneath the plate $b$, Figs. 10 and 12.

By means of the notch $s$ and the curved shape of the portion between the end $r$ and the fulcrum $q$ the lever $p$ can be placed in position and rotate on its fulcrum $q$ and on one of the buttresses $g$ in the necessary manner. The end $r$ thereby raises the plate $b$, which slides with a certain amount of play on the post until its wedge extension $i$ disengages from the buttresses $g$, whereupon the post inverts by the side pressure of the load. As the trucks are always placed near the ends of the timber which they carry for the sake of mobility and since with the present device the posts are released by an operator standing at the ends of the wagon, there can be no danger from falling logs.

The pin $k$ in order to avoid loss is suitably connected by a chain or the like to the truck-frame of the wagon.

Having now particularly described and ascertained the nature of my said invention and in what manner the same is to be performed, I declare that what I claim is—

1. A device for securing in its operative position, in a readily-released manner, a pivoted side post of the cradle of a timber-wagon, comprising a cradle-beam, a post pivoted within the forked end of the beam, a plate threaded over the post and a buttress in rigid union with the cradle-beam, which buttress is adapted to resist outward movement of the plate, and thereby the post due to the side pressure thereon of the timber.

2. A device for securing in its operative position, in a readily-released manner, a pivoted side post of the cradle of a timber-wagon, comprising a cradle-beam, a post pivoted within the forked end of the beam, a plate threaded over the post which, on the side toward the end of the cradle-beam is wedge-shaped, and a buttress in rigid union with the cradle-beam, which buttress is correspondingly wedge-shaped to receive the said wedge-shaped side of the plate and resist outward movement of the plate and thereby the post due to the side pressure thereon of the timber.

3. A device for securing in its operative position, in a readily-released manner, a pivoted side post of the cradle of a timber-wagon, comprising a cradle-beam, a post pivoted within the forked end of the beam, a plate threaded over the post, a buttress in rigid union with the cradle-beam, which buttress is adapted to resist outward movement of the plate and thereby the post, due to the side pressure thereon of the timber, and a pin having a feather on its point and a cranked handle, which pin is adapted to be inserted through a hole in the post above the plate in one angular position and to preclude withdrawal in other angular positions.

4. A device for securing in its operative position, in a readily-released manner, a pivoted side post of the cradle of a timber-wagon, comprising a cradle-beam, a post pivoted within the forked end of the beam, a plate threaded over the post which, on the side toward the end of the cradle-beam, is wedge-shaped, and a buttress in rigid union with the cradle-beam, which buttress is correspondingly wedge-shaped to receive the said wedge-shaped side of the plate and resist outward movement of the plate and thereby the post due to the side pressure thereon of the timber, and a lever for releasing the plate, comprising a flat under side which serves as a fulcrum and a projected end and a notch, as described.

In testimony that I claim the foregoing as my invention I have signed my name in presence of two subscribing witnesses.

BERNHARD GROEDEL VON GYULAFALVA.

Witnesses:
ARTHUR NEISE,
LOUIS VANDORE.